US012753254B2

(12) United States Patent
Saito et al.

(10) Patent No.: US 12,753,254 B2
(45) Date of Patent: Oct. 6, 2026

(54) RESIN COMPOSITION, PREPREG USING SAME, FILM PROVIDED WITH RESIN, METAL FOIL PROVIDED WITH RESIN, METAL-CLAD LAMINATE, AND WIRING BOARD

(71) Applicant: PANASONIC INTELLECTUAL PROPERTY MANAGEMENT CO., LTD., Osaka (JP)

(72) Inventors: Hirosuke Saito, Osaka (JP); Yasunori Nishiguchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 530 days.

(21) Appl. No.: 18/561,065

(22) PCT Filed: May 16, 2022

(86) PCT No.: PCT/JP2022/020357
§ 371 (c)(1),
(2) Date: Nov. 15, 2023

(87) PCT Pub. No.: WO2022/244723
PCT Pub. Date: Nov. 24, 2022

(65) Prior Publication Data

US 2024/0270885 A1 Aug. 15, 2024

(30) Foreign Application Priority Data

May 17, 2021 (JP) ................................ 2021-083146

(51) Int. Cl.

| | |
|---|---|
| ***C08F 212/34*** | (2006.01) |
| ***C08F 222/40*** | (2006.01) |
| ***C08J 5/24*** | (2006.01) |
| ***C08K 3/013*** | (2018.01) |
| ***C08K 5/49*** | (2006.01) |

(52) U.S. Cl.
CPC .......... *C08F 212/34* (2013.01); *C08F 222/40* (2013.01); *C08J 5/24* (2013.01); *C08K 3/013* (2018.01); *C08K 5/49* (2013.01)

(58) Field of Classification Search
None
See application file for complete search history.

(56) References Cited

U.S. PATENT DOCUMENTS

| | | | |
|---|---|---|---|
| 5,399,715 A | 3/1995 | Naitoh et al. | |
| 2008/0004367 A1 | 1/2008 | Takada et al. | |
| 2020/0166839 A1* | 5/2020 | Hirano | G03F 7/11 |
| 2022/0251254 A1* | 8/2022 | Shimono | C08F 22/40 |

FOREIGN PATENT DOCUMENTS

| | | | | |
|---|---|---|---|---|
| JP | 2004271692 A * | 9/2004 | | |
| JP | 2006-063230 A | 3/2006 | | |
| JP | 2017-137492 A | 8/2017 | | |
| KR | 20170007642 A * | 1/2017 | | C07C 15/12 |
| WO | 93/12933 A1 | 7/1993 | | |
| WO | 2006/059750 A1 | 6/2006 | | |
| WO | 2020/217678 A1 | 10/2020 | | |

OTHER PUBLICATIONS

Indane-Based Bismaleimide and Cloisite 15a Nanoclay Blends: Kinetics of Thermal Curing and Degradation of Particulate Nanocomposites (Year: 2013).*
ISR issued in International Patent Application No. PCT/JP2022/020357, Jul. 12, 2022, translation.

* cited by examiner

*Primary Examiner* — Robert S Jones, Jr.
*Assistant Examiner* — Lily K Sloan
(74) *Attorney, Agent, or Firm* — GREENBLUM & BERNSTEIN, P.L.C.

(57) ABSTRACT

An aspect of the present invention relates to a resin composition containing a maleimide compound (A) having an indane structure in the molecule and a hydrocarbon-based compound (B) represented by the following Formula (1). In Formula (1), X represents a hydrocarbon group having 6 or more carbon atoms and containing at least one selected from an aromatic cyclic group and an aliphatic cyclic group. n represents an integer from 1 to 10.

18 Claims, 9 Drawing Sheets

RESIN COMPOSITION, PREPREG USING SAME, FILM PROVIDED WITH RESIN, METAL FOIL PROVIDED WITH RESIN, METAL-CLAD LAMINATE, AND WIRING BOARD

TECHNICAL FIELD

The present invention relates to a resin composition, and a prepreg using the resin composition, a film with resin, a metal foil with resin, a metal-clad laminate, and a wiring board.

BACKGROUND ART

In recent years, in various electronic devices, mounting technologies such as higher integration of semiconductor devices to be mounted, higher wiring density, and multi-layering have rapidly progressed along with an increase in the amount of information processed. Substrate materials for forming base materials of wiring boards used in various electronic devices are required to have a low dielectric constant and a low dielectric loss tangent to increase the transmission speed of signals and decrease the loss during signal transmission.

In particular, as typified by substrate-like printed wiring boards (SLP), the barrier between printed wiring boards and semiconductor package substrates is disappearing in recent years. Therefore, with the recent miniaturization and high performance of electronic devices and the remarkable improvement of information communication speed, any substrate is required to be compatible with high frequencies as well as exhibit excellent heat resistance and low thermal expansion properties.

As a material for such substrates, maleimide resin is used since high heat resistance can be secured, and maleimide affording a low dielectric constant and a low dielectric loss tangent has been proposed in order to achieve compatibility with high frequencies and low transmission loss.

For example, Patent Literature 1 discloses a resin composition affording well-balanced cured product properties between high glass transition temperature (Tg) and dielectric properties (relative dielectric constant, dielectric loss tangent) by combining a polymaleimide resin having a specific structure and an unsaturated double bond group-containing compound.

Patent Literature 2 reports a curable resin composition capable of imparting a low dielectric constant and a low dielectric loss tangent as well as an excellent high Tg to its cured product by containing a maleimide having an indane skeleton and a diene-based polymer.

However, it is required to secure even lower dielectric properties although a certain degree of low dielectric properties can be attained by use of the maleimide resins described in Patent Literatures 1 and 2. Maleimide resins also have a drawback of high water absorbing properties, and at present, securing of low water absorbing properties is not achieved. Wiring boards used in various kinds of electronic equipment are also required to be hardly affected by changes in the external environment. For example, substrate materials for forming insulating layers of wiring boards are required to afford cured products exhibiting low water absorbing properties so that the wiring boards can be used in a high humidity environment as well. It is considered that the insulating layers of wiring boards obtained from such substrate materials that afford cured products exhibiting low water absorbing properties can suppress moisture absorption.

The present invention is made in view of such circumstances, and an object thereof is to provide a resin composition capable of achieving even lower dielectric properties and low water absorbing properties of its cured product while maintaining properties such as a high Tg. Another object of the present invention is to provide a prepreg, a film with resin, a metal foil with resin, a metal-clad laminate, and a wiring board, which are obtained using the resin composition.

CITATION LIST

Patent Literature

Patent Literature 1: JP 2017-137492 A
Patent Literature 2: WO 2020/217678 A

SUMMARY OF INVENTION

A resin composition according to an aspect of the present invention contains a maleimide compound (A) having an indane structure in the molecule and a hydrocarbon-based compound (B) represented by the following Formula (1).

[Chemical formula 1]

(1)

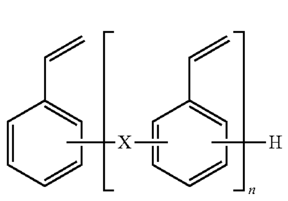

In Formula (1), X represents a hydrocarbon group having 6 or more carbon atoms and containing at least one selected from an aromatic cyclic group and an aliphatic cyclic group. n represents an integer from 1 to 10.

DESCRIPTION OF EMBODIMENTS

Figure 1:
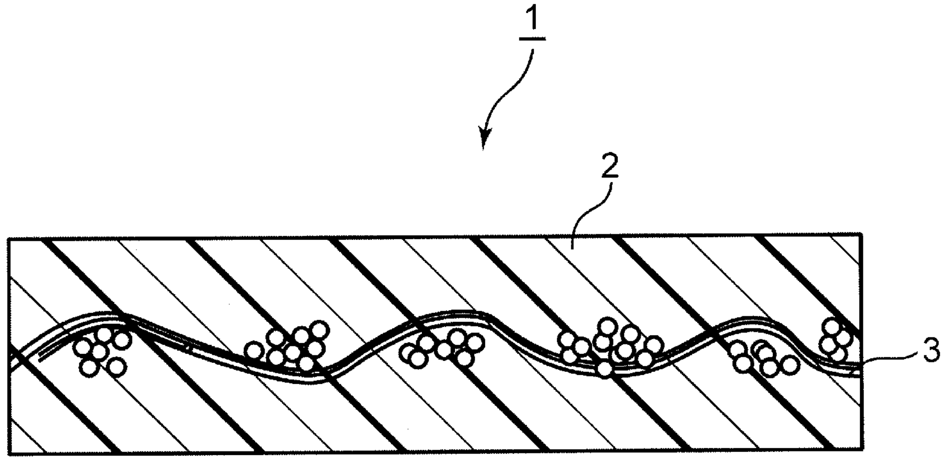
FIG. 1 is a schematic sectional view illustrating the configuration of a prepreg according to an embodiment of the present invention.

A resin composition according to an embodiment of the present invention (hereinafter also simply referred to as a resin composition) contains a maleimide compound (A) having an indane structure in the molecule and a hydrocarbon-based compound (B) represented by Formula (1).

By containing the hydrocarbon-based compound (B) in addition to the maleimide compound (A) having an indane structure in the molecule, even lower dielectric properties and low water absorbing properties of the cured product can be achieved while the high Tg (glass transition temperature) is maintained.

As for the material properties, a material imparting a high Tg to a cured product is one of the factors for further improvement in heat resistance (solder heat resistance, reflow heat resistance, and the like). A material imparting a high Tg to a cured product has also an advantage that the coefficient of thermal expansion of the material is a small value in a temperature region from room temperature to reflow or solder temperature. This is because thermal expansion generally increases sharply at a temperature exceeding the glass transition temperature. In other words, when the glass transition temperature is low, the coefficient of thermal expansion increases in a high temperature region exceeding the glass transition temperature. When the glass transition temperature is low, the thermal expansion in a higher temperature region is greater, and for example, troubles such as warping may occur and connection reliability may decrease in the wiring board.

Hence, according to the present embodiment, it is possible to provide a resin composition capable of imparting even lower dielectric properties and low water absorbing properties to its cured product while exhibiting low dielectric properties and maintaining properties such as a high Tg. By using the resin composition, it is possible to provide a prepreg, a film with resin, a metal foil with resin, a metal-clad laminate, and a wiring board, which exhibit properties such as low dielectric properties, low water absorbing properties, and a high Tg.

Hereinafter, the respective components of the resin composition according to the present embodiment will be specifically described.

<Maleimide Compound (A)>

The maleimide compound (A) used in the present embodiment is not particularly limited as long as it is a maleimide compound having an indane structure in the molecule. By using such a maleimide compound, a resin composition having a high Tg as well as low dielectric properties can be obtained.

Examples of the indane structure include a divalent group obtained by eliminating two hydrogen atoms from indane or indane substituted with a substituent, and more specific examples thereof include a structure represented by the following Formula (2). In other words, examples of the maleimide compound (A) include maleimide compounds having a structure represented by the following Formula (2) in the molecule. The maleimide compound (A) also has a maleimide group in the molecule.

[Chemical formula 2]

(2)

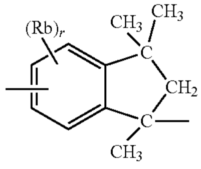

In Formula (2), Rb's are independent of each other. In other words, Rb's may be the same group as or different groups from each other, and for example, when r is 2 or 3, two or three Rb's bonded to the same benzene ring may be the same group as or different groups from each other. Rb represents an alkyl group having 1 to 10 carbon atoms, an alkyloxy group (alkoxy group) having 1 to 10 carbon atoms, an alkylthio group having 1 to 10 carbon atoms, an aryl group having 6 to 10 carbon atoms, an aryloxy group having 6 to 10 carbon atoms, an arylthio group having 6 to 10 carbon atoms, a cycloalkyl group having 3 to 10 carbon atoms, a halogen atom, a hydroxyl group, or a mercapto group (thiol group). r represents an integer from 0 to 3.

More specific examples include a maleimide compound (A1) having a structure represented by the following Formula (3) in the molecule.

[Chemical formula 3]

(3)

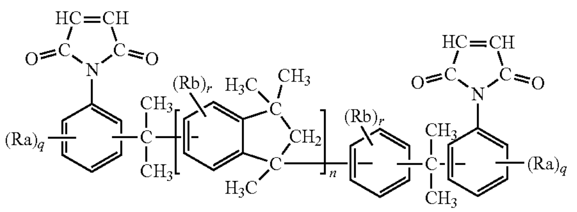

In Formula (3), Ra's are independent of each other. In other words, Ra's may be the same group as or different groups from each other, and for example, when q is 2 to 4, two to four Ra's bonded to the same benzene ring may be the same group as or different groups from each other. Ra represents an alkyl group having 1 to 10 carbon atoms, an alkyloxy group having 1 to 10 carbon atoms, an alkylthio group having 1 to 10 carbon atoms, an aryl group having 6 to 10 carbon atoms, an aryloxy group having 6 to 10 carbon atoms, an arylthio group having 6 to 10 carbon atoms, a cycloalkyl group having 3 to 10 carbon atoms, a halogen atom, a nitro group, a hydroxyl group, or a mercapto group. Rb is the same as Rb in Formula (1), and Rb's each independently represent an alkyl group having 1 to 10 carbon atoms, an alkyloxy group having 1 to 10 carbon atoms, an alkylthio group having 1 to 10 carbon atoms, an aryl group having 6 to 10 carbon atoms, an aryloxy group having 6 to 10 carbon atoms, an arylthio group having 6 to 10 carbon atoms, a cycloalkyl group having 3 to 10 carbon atoms, a halogen atom, a nitro group, a hydroxyl group, or a mercapto group. q represents an integer from 0 to 4. r represents an integer from 0 to 3. n represents an integer from 0.95 to 10.

r is the average value of the degree of substitution of Rb, it is more preferable as r is smaller, and specifically, r is preferably 0. In other words, in the benzene ring to which Rb may be bonded, it is preferable that a hydrogen atom is bonded to the position to which Rb may be bonded. The maleimide compound in which r is 0 has the advantage of being easily synthesized. It is considered that this is because steric hindrance is diminished and the electron density in the aromatic ring increases. In a case where r is 1 to 3, Rb is preferably at least one selected from the group consisting of an alkyl group having 1 to 4 carbon atoms, a cycloalkyl group having 3 to 6 carbon atoms, and an aryl group having 6 to 10 carbon atoms among the groups described above. Ra is preferably at least one selected from the group consisting of an alkyl group having 1 to 4 carbon atoms, a cycloalkyl group having 3 to 6 carbon atoms, and an aryl group having 6 to 10 carbon atoms among the groups described above. As Ra and Rb are an alkyl group having 1 to 4 carbon atoms, a cycloalkyl group having 3 to 6 carbon atoms, or an aryl group having 6 to 10 carbon atoms, it is considered that the maleimide compound is readily dissolved in a solvent as well as a decrease in reactivity of the maleimide group can be suppressed and a suitable cured product is obtained. It is considered that this is due to a decrease in planarity in the vicinity of the maleimide group, a decrease in crystallinity, and the like.

Specific examples of the groups represented by Ra and Rb include the following groups.

The alkyl group having 1 to 10 carbon atoms is not particularly limited, and examples thereof include a methyl group, an ethyl group, a propyl group, a hexyl group and a decyl group.

The alkyloxy group having 1 to 10 carbon atoms is not particularly limited, and examples thereof include a methyloxy group, an ethyloxy group, a propyloxy group, a hexyloxy group and a decyloxy group.

The alkylthio group having 1 to 10 carbon atoms is not particularly limited, and examples thereof include a methylthio group, an ethylthio group, a propylthio group, a hexylthio group and a decylthio group.

The aryl group having 6 to 10 carbon atoms is not particularly limited, and examples thereof include a phenyl group and a naphthyl group.

The aryloxy group having 6 to 10 carbon atoms is not particularly limited, and examples thereof include a phenyloxy group and a naphthyloxy group.

The arylthio group having 6 to 10 carbon atoms is not particularly limited, and examples thereof include a phenylthio group and a naphthylthio group.

The cycloalkyl group having 3 to 10 carbon atoms is not particularly limited, and examples thereof include a cyclopropyl group, a cyclobutyl group, a cyclohexyl group, and a cyclooctyl group.

Examples of the halogen atom include a fluorine atom, a chlorine atom, a bromine atom, and an iodine atom.

q is the average value of the degree of substitution of Ra, and is preferably 2 to 3, more preferably 2. The maleimide compound in which q is 2 has the advantage of being easily synthesized. It is considered that this is because steric hindrance is diminished and the electron density in the aromatic ring increases particularly when q is 2.

n is the average value of the number of repetitions, and is 0.95 to 10 as described above, preferably 0.98 to 8, more preferably 1 to 7, still more preferably 1.1 to 6. The content of the maleimide compound in which n that is the average value of the number of repetitions (degree of polymerization) is 0 in the maleimide compound (A1) represented by Formula (3) is preferably 32% by mass or less with respect to the total amount of the maleimide compound.

The molecular weight distribution (Mw/Mn) of the maleimide compound (A) of the present embodiment acquired by GPC measurement is preferably 1 to 4, more preferably 1.1 to 3.8, still more preferably 1.2 to 3.6, particularly preferably 1.3 to 3.4. The molecular weight distribution is acquired by gel permeation chromatography (GPC) measurement.

Still more specific examples of the maleimide compound (A) include maleimide compounds represented by the following Formulas (5) to (7).

[Chemical formula 4]

(5)

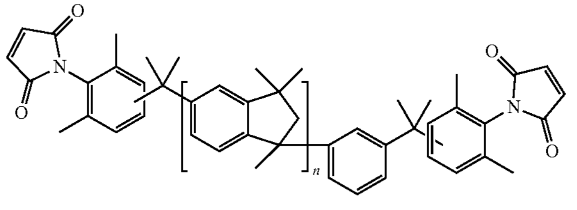

In Formula (5), n represents an integer from 0.95 to 10.

[Chemical formula 5]

(6)

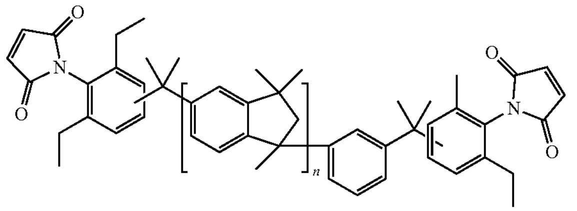

In Formula (6), n represents an integer from 0.95 to 10.

[Chemical formula 6]

(7)

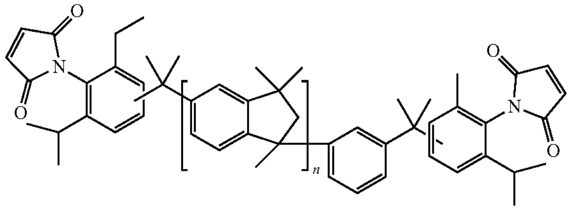

In Formula (7), n represents an integer from 0.95 to 10.

The method for producing the maleimide compound (A) of the present embodiment is not particularly limited. Specifically, the maleimide compound (A) is obtained by, for example, a so-called maleimidation reaction in which an amine compound represented by the following Formula (8) is reacted with maleic anhydride in an organic solvent such as toluene in the presence of a catalyst such as toluenesulfonic acid. More specifically, after the maleimidation reaction, unreacted maleic anhydride and other impurities are removed by washing with water and the like, and the solvent is removed by reducing the pressure, whereby the maleimide compound (A) is obtained. A dehydrating agent may be used during this reaction.

[Chemical formula 7]

(8)

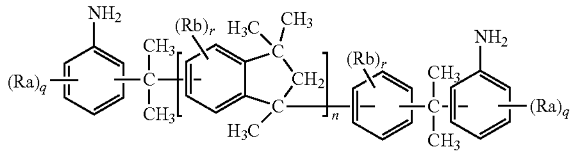

In Formula (8), Ra's are independent of each other. In other words, Ra's may be the same group as or different groups from each other, and for example, when q is 2 to 4, two to four Ra's bonded to the same benzene ring may be the same group as or different groups from each other. Ra represents an alkyl group having 1 to 10 carbon atoms, an alkyloxy group having 1 to 10 carbon atoms, an alkylthio group having 1 to 10 carbon atoms, an aryl group having 6 to 10 carbon atoms, an aryloxy group having 6 to 10 carbon atoms, an arylthio group having 6 to 10 carbon atoms, a cycloalkyl group having 3 to 10 carbon atoms, a halogen atom, a nitro group, a hydroxyl group, or a mercapto group. Rb is the same as Rb in Formula (1), and Rb's each independently represent an alkyl group having 1 to 10 carbon atoms, an alkyloxy group having 1 to 10 carbon atoms, an alkylthio group having 1 to 10 carbon atoms, an aryl group having 6 to 10 carbon atoms, an aryloxy group having 6 to 10 carbon atoms, an arylthio group having 6 to 10 carbon atoms, a cycloalkyl group having 3 to 10 carbon atoms, a halogen atom, a nitro group, a hydroxyl group, or a mercapto group. q represents an integer from 0 to 4. r represents an integer from 0 to 3. n represents an integer from 0.95 to 10.

The amine compound represented by Formula (8) is obtained by, for example, reacting 2,6-dimethylaniline with α,α'-dihydroxy-1,3-diisopropylbenzene in an organic solvent such as xylene using activated clay as a catalyst.

A commercially available product can also be used as the maleimide compound (A) of the present embodiment.

<Hydrocarbon-Based Compound (B)>

The hydrocarbon-based compound (B) contained in the resin composition of the present embodiment is a compound represented by the following Formula (1).

[Chemical formula 8]

(1)

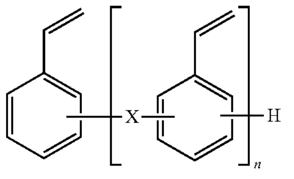

In Formula (1), X represents a hydrocarbon group having 6 or more carbon atoms and containing at least one selected from an aromatic cyclic group and an aliphatic cyclic group. n represents an integer from 1 to 10.

By containing such a hydrocarbon-based compound (B), it is considered that the resin composition of the present embodiment enables its cured product to attain even lower dielectric properties and keep water absorbing properties low while maintaining a high Tg.

The aromatic cyclic group is not particularly limited, but examples thereof include a phenylene group, a xylylene group, a naphthylene group, a tolylene group, and a biphenylene group.

The aliphatic cyclic group is not particularly limited, but examples thereof include a group containing an indane structure represented by Formula (2) and a group containing a cycloolefin structure.

The number of carbon atoms is not particularly limited as long as it is 6 or more, but is more preferably 6 or more and 20 or less from the viewpoint of maintaining a high Tg.

In a preferred embodiment, the hydrocarbon-based compound of the present embodiment includes a hydrocarbon-based compound (B1) represented by the following Formula (4).

[Chemical formula 9]

(4)

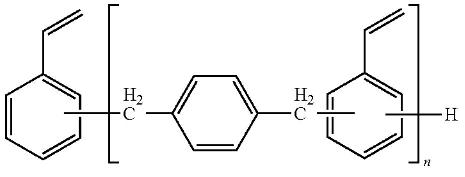

In Formula (4), n represents an integer from 1 to 10.

By containing such a hydrocarbon-based compound (B1), it is considered that the effects as described above can be attained more reliably.

<Reactive Compound (C)>

The resin composition according to the present embodiment may contain a reactive compound (C) that reacts with at least one of the maleimide compound (A) and the hydrocarbon-based compound (B), if necessary, as long as the effects of the present invention are not impaired. By containing such a reactive compound (C), it is considered that close contact properties (for example, close contact properties to metal foil) and low thermal expansion properties can be further imparted to the resin composition.

Here, the reactive compound refers to a compound that reacts with at least one of the hydrocarbon-based compound (B) and the maleimide compound and contributes to curing of the resin composition. Examples of the reactive compound (C) include a maleimide compound (D) different from the maleimide compound (A), an epoxy compound, a methacrylate compound, an acrylate compound, a vinyl compound, a cyanate ester compound, an active ester compound, an allyl compound, a benzoxazine compound, a phenol compound, and a polyphenylene ether compound.

The maleimide compound (D) different from the maleimide compound (A) is a maleimide compound that has a maleimide group in the molecule but does not have an indane structure in the molecule. The maleimide compound (D) is not particularly limited as long as it has one or more maleimide groups in the molecule but does not have an indane structure in the molecule, and examples thereof include a maleimide compound having one or more maleimide groups in the molecule and a modified maleimide compound.

More specific examples of the maleimide compound (D) include phenylmaleimide compounds such as 4,4'-diphenylmethanebismaleimide, polyphenylmethane maleimide, m-phenylenebismaleimide, bisphenol A diphenyl ether bismaleimide, 3,3'-dimethyl-5,5'-diethyl-4,4'-diphenylmethanebismaleimide, 4-methyl-1,3-phenylenebismaleimide, and a biphenylaralkyl-type polymaleimide compound, and a N-alkylbismaleimide compound having an aliphatic skeleton. Examples of the modified maleimide compound include a modified maleimide compound in which a part of the molecule is modified with an amine compound and a modified maleimide compound in which a part of the molecule is modified with a silicone compound. As a maleimide compound different from the maleimide compound, a commercially available product can also be used, and for example, MIR-3000-70MT and MIR-5000 manufactured by Nippon Kayaku Co., Ltd., BMI-4000, BMI-5100, BMI-2300, and BMI-TMH manufactured by Daiwa Kasei Industry Co., Ltd., and BMI-689, BMI-1500, BMI-3000J and BMI-5000 manufactured by Designer Molecules Inc. may be used.

The epoxy compound is a compound having an epoxy group in the molecule, and specific examples thereof include a bixylenol-type epoxy compound, a bisphenol A-type epoxy compound, a bisphenol F-type epoxy compound, a bisphenol S-type epoxy compound, a bisphenol AF-type epoxy compound, a dicyclopentadiene-type epoxy compound, a trisphenol-type epoxy compound, a naphthol novolac-type epoxy compound, a phenol novolac-type epoxy compound, a tert-butyl-catechol-type epoxy compound, a naphthalene-type epoxy compound, a naphthol-type epoxy compound, an anthracene-type epoxy compound, a glycidylamine-type epoxy compound, a glycidyl ester-type epoxy compound, a cresol novolac-type epoxy compound, a biphenyl-type epoxy compound, a linear aliphatic epoxy compound, an epoxy compound having a butadiene structure, an alicyclic epoxy compound, a heterocyclic epoxy compound, a spiro ring-containing epoxy compound, a cyclohexane-type epoxy compound, a cyclohexanedimethanol-type epoxy compound, a naphthylene ether-type epoxy compound, a trimethylol-type epoxy compound, and a tetraphenylethane-type epoxy compound. The epoxy compound also includes an epoxy resin, which is a polymer of each of the epoxy compounds.

The methacrylate compound is a compound having a methacryloyl group in the molecule, and examples thereof include a monofunctional methacrylate compound having one methacryloyl group in the molecule and a polyfunctional methacrylate compound having two or more methacryloyl groups in the molecule. Examples of the monofunctional methacrylate compound include methyl methacrylate, ethyl methacrylate, propyl methacrylate, and butyl methacrylate. Examples of the polyfunctional methacrylate compound include dimethacrylate compounds such as tricyclodecanedimethanol dimethacrylate (DCP).

The acrylate compound is a compound having an acryloyl group in the molecule, and examples thereof include a monofunctional acrylate compound having one acryloyl group in the molecule and a polyfunctional acrylate compound having two or more acryloyl groups in the molecule. Examples of the monofunctional acrylate compound include methyl acrylate, ethyl acrylate, propyl acrylate, and butyl acrylate. Examples of the polyfunctional acrylate compound include diacrylate compounds such as tricyclodecanedimethanol diacrylate.

The vinyl compound is a compound having a vinyl group in the molecule, and examples thereof include a monofunctional vinyl compound (monovinyl compound) having one vinyl group in the molecule and a polyfunctional vinyl compound having two or more vinyl groups in the molecule. Examples of the polyfunctional vinyl compound include divinylbenzene, curable polybutadiene having a carbon-carbon unsaturated double bond in the molecule, and a curable butadiene-styrene copolymer having a carbon-carbon unsaturated double bond in the molecule.

The cyanate ester compound is a compound having a cyanato group in the molecule, and examples thereof include a phenol novolac-type cyanate ester compound, a naphthol aralkyl-type cyanate ester compound, a biphenyl aralkyl-type cyanate ester compound, a naphthylene ether-type cyanate ester compound, a xylene resin-type cyanate ester compound, and an adamantane skeleton-type cyanate ester compound.

The active ester compound is a compound having an ester group exhibiting high reaction activity in the molecule, and examples thereof include a benzenecarboxylic acid active ester, a benzenedicarboxylic acid active ester, a benzenetricarboxylic acid active ester, a benzenetetracarboxylic acid active ester, a naphthalenecarboxylic acid active ester, a naphthalenedicarboxylic acid active ester, a naphthalenetricarboxylic acid active ester, a naphthalenetetracarboxylic acid active ester, a fluorenecarboxylic acid active ester, a fluorenedicarboxylic acid active ester, a fluorenetricarboxylic acid active ester, and a fluorenetetracarboxylic acid active ester.

The allyl compound is a compound having an allyl group in the molecule, and examples thereof include a triallyl isocyanurate compound such as triallyl isocyanurate (TAIC), a diallyl bisphenol compound, and diallyl phthalate (DAP).

As the benzoxazine compound, for example, a benzoxazine compound represented by the following General Formula (C-I) can be used.

[Chemical formula 10]

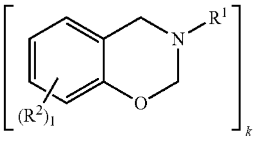

(C-I)

In Formula (C-1), $R^1$ represents a k-valent group, and each $R^2$ independently represents a halogen atom, an alkyl group, or an aryl group. k represents an integer from 2 to 4 and 1 represents an integer from 0 to 4.

Commercially available products include "JBZ-OP100D" and "ODA-BOZ" manufactured by JFE Chemical Corporation; "P-d", "F-a" and "ALP-d" manufactured by SHIKOKU CHEMICALS CORPORATION, and "HFB2006M" manufactured by Showa Highpolymer Co., Ltd, and the like.

As the phenol compound, a compound containing a hydroxy group bonded to an aromatic ring in the molecule can be used, and examples thereof include a bisphenol A-type phenol compound, a bisphenol E-type phenol compound, a bisphenol F-type phenol compound, a bisphenol S-type phenol compound, a phenol novolac compound, a bisphenol A novolac-type phenol compound, a glycidyl ester-type phenol compound, an aralkyl novolac-type phenol compound, a biphenylaralkyl-type phenol compound, a cresol novolac-type phenol compound, a polyfunctional phenol compound, a naphthol compound, a naphthol novolac compound, a polyfunctional naphthol compound, an anthracene-type phenol compound, a naphthalene skeleton-modified novolac-type phenol compound, a phenol aralkyl-type phenol compound, a naphtholaralkyl-type phenol compound, a dicyclopentadiene-type phenol compound, a biphenyl-type phenol compound, an alicyclic phenol compound, a polyol-type phenol resin, a phosphorus-containing phenol compound, a polymerizable unsaturated hydrocarbon group-containing phenol compound, and a hydroxyl group-containing silicone compound.

The polyphenylene ether compound can be synthesized by a known method, or a commercially available product can be used. Examples of the commercially available product include "OPE-2st 1200" and "OPE-2st 2200" manufactured by Mitsubishi Gas Chemical Company Inc., and "SA9000", "SA90", "SA120" and "Noryl640" manufactured by SABIC Innovative Plastics.

As the reactive compound (C), the compounds mentioned above may be used singly or in combination of two or more kinds thereof.

(Content)

In the resin composition of the present embodiment, the content of the maleimide compound (A) is preferably 20 to 80 parts by mass with respect to 100 parts by mass of the total mass of the maleimide compound (A) and the hydrocarbon-based compound (B). When the content is in such a range, it is considered that the effects of the present invention as described above can be attained more reliably. A more preferable range of the content is 30 parts by mass or more and 70 parts by mass or less.

In a case where the resin composition of the present embodiment contains the reactive compound (C), the content of the hydrocarbon-based compound (B) is preferably 5 to 50 parts by mass, more preferably 20 to 50 parts by mass with respect to 100 parts by mass of the sum of the maleimide compound (A), the hydrocarbon-based compound (B), and the reactive compound (C).

In that case, the content of the reactive compound (C) is preferably 1 to 40 parts by mass, more preferably 1 to 30 parts by mass with respect to 100 parts by mass of the sum of the maleimide compound (A), the hydrocarbon-based compound (B), and the reactive compound (C).

(Inorganic Filler)

The resin composition according to the present embodiment may further contain an inorganic filler. The inorganic filler is not particularly limited and includes those added to enhance the heat resistance and flame retardancy of the cured product of a resin composition. By containing an inorganic filler, it is considered that heat resistance, flame retardancy and the like can be further enhanced as well as the coefficient of thermal expansion can be kept lower (achievement of even lower thermal expansion properties).

Specific examples of the inorganic filler that can be used in the present embodiment include metal oxides such as silica, alumina, titanium oxide, magnesium oxide, and mica, metal hydroxides such as magnesium hydroxide and aluminum hydroxide, talc, aluminum borate, barium sulfate, aluminum nitride, boron nitride, barium titanate, strontium titanate, calcium titanate, aluminum titanate, barium zirconate titanate, barium zirconate, calcium zirconate, zirconium phosphate, zirconium tungstate phosphate, magnesium carbonate such as anhydrous magnesium carbonate, calcium carbonate, and boehmite-treated products thereof. Among these, silica, metal hydroxides such as magnesium hydroxide and aluminum hydroxide, aluminum oxide, boron nitride, and barium titanate, strontium titanate and the like are preferable, and silica is more preferable. The silica is not particularly limited, and examples thereof include crushed silica, spherical silica, and silica particles.

These inorganic fillers may be used singly or in combination of two or more kinds thereof. An inorganic filler as described above may be used as it is, but one subjected to a surface treatment with an epoxysilane-type, vinylsilane-type, methacrylsilane-type, phenylaminosilane-type, or aminosilane-type silane coupling agent may be used. The silane coupling agent can be used by being added to the filler by an integral blend method instead of the method of treating the surface of the filler with the silane coupling agent in advance.

In a case where the resin composition of the present embodiment contains an inorganic filler, the content of the inorganic filler is preferably 10 to 300 parts by mass, more preferably 40 to 250 parts by mass with respect to 100 parts by mass of the total mass of the maleimide compound (A) and the hydrocarbon-based compound (B).

(Flame Retardant)

The resin composition according to the present embodiment may further contain a flame retardant. The flame retardancy of a cured product of the resin composition can be further enhanced by containing a flame retardant.

The flame retardant that can be used in the present embodiment is not particularly limited. Specifically, in the field in which halogen-based flame retardants such as bromine-based flame retardants are used, for example, ethylenedipentabromobenzene, ethylenebistetrabromoimide, decabromodiphenyloxide, and tetradecabromodiphenoxybenzene which have a melting point of 300° C. or more are preferable. It is considered that the elimination of halogen at a high temperature and the decrease in heat resistance can be suppressed by the use of a halogen-based flame retardant. There is a case where a flame retardant containing phosphorus (phosphorus-based flame retardant) is used in fields required to be halogen-free. The phosphorus-based flame retardant is not particularly limited, and examples thereof include an HCA-based flame retardant, a phosphate ester-based flame retardant, a phosphazene-based flame retardant, a bis(diphenylphosphine oxide)-based flame retardant, and a phosphinate-based flame retardant. Specific examples of the HCA-based flame retardant include 9,10-dihydro-9-oxa-10-phosphaphenanthren-10-yl-10-oxide, 10-(2,5-dihydroxyphenyl)-9,10-dihydro-9-oxa-10-phosphaphenanthrene-10-oxide, and compounds obtained by reacting these in advance. Specific examples of the phosphate ester-based flame retardant include a condensed phosphate ester such as dixylenyl phosphate. Specific examples of the phosphazene-based flame retardant include phenoxyphosphazene. Specific examples of the bis(diphenylphosphine oxide)-based flame retardant include xylylenebis(diphenylphosphine oxide). Specific examples of the phosphinate-based flame retardant include metal phosphinates such as an aluminum dialkyl phosphinate. As the flame retardant, the respective flame retardants exemplified may be used singly or in combination of two or more kinds thereof.

In a case where the resin composition of the present embodiment contains a flame retardant, the content of the flame retardant is preferably 3 to 50 parts by mass, more preferably 5 to 40 parts by mass with respect to 100 parts by mass of the total mass of the resin composition except for the inorganic filler.

<Other Components>

The resin composition according to the present embodiment may contain components (other components) other than the components described above if necessary as long as the effects of the present invention are not impaired. As the other components contained in the resin composition according to the present embodiment, for example, additives such as catalysts including a reaction initiator and a reaction accelerator, a silane coupling agent, a polymerization inhibitor, a polymerization retardant, an auxiliary flame retardant, an antifoaming agent, a leveling agent, an antioxidant, a heat stabilizer, an antistatic agent, an ultraviolet absorber, a dye or a pigment, a dispersant, and a lubricant may be further contained.

The resin composition according to the present embodiment may contain a reaction initiator (catalyst) and a reaction accelerator as described above. The reaction initiator and reaction accelerator are not particularly limited as long as they can promote the curing reaction of the resin composition. Specifically, examples thereof include metal oxides, azo compounds, peroxides, imidazole compounds, phosphorus-based curing accelerators, and amine-based curing accelerators.

Specific examples of metal oxides include zinc octylate, tin octylate, zinc naphthenate, cobalt naphthenate, tin stearate, and zinc stearate.

Examples of peroxides include α,α'-di(t-butylperoxy)diisopropylbenzene, 2,5-dimethyl-2,5-di(t-butylpcroxy)-3-hexyne, benzoyl peroxide, 3,3',5,5'-tetramethyl-1,4-diphenoquinone, chloranil, 2,4,6-tri-t-butylphenoxyl, t-butylperoxyisopropyl monocarbonate, and azobisisobutyronitrile.

Specific examples of azo compounds include 2,2'-azobis(2,4,4-trimethylpentane), 2,2'-azobis(N-butyl-2-methylpropionamide), and 2,2'-azobis(2-methylbutyronitrile).

Among these, α,α'-di(t-butylperoxy)diisopropylbenzene is preferably used as a preferable reaction initiator, α,α'-Di(t-butylperoxy)diisopropylbenzene exhibits low volatility, thus does not volatilize at the time of drying and storage, and exhibits favorable stability. α,α'-Di(t-butylperoxy)diisopropylbenzene has a relatively high reaction initiation temperature and thus can suppress the promotion of the curing reaction at the time point at which curing is not required, for example, at the time of prepreg drying. By suppressing the curing reaction, it is possible to suppress a decrease in storage stability of the resin composition.

Examples of phosphorus-based curing accelerators include triphenylphosphine, phosphonium borate compounds, tetraphenylphosphonium tetraphenylborate, n-butylphosphonium tetraphenylborate, tetrabutylphosphonium decanoate, (4-methylphenyl)triphenylphosphonium thiocyanate, tetraphenylphosphonium thiocyanate, and butyltriphenylphosphonium thiocyanate.

Examples of amine-based curing accelerators include trialkylamines such as triethylamine and tributylamine, 4-dimethylaminopyridine (DMAP), benzyldimethylamine, 2,4,6-tris(dimethylaminomethyl)phenol, and 1,8-diazabicyclo(5,4,0)-undecene.

Examples of imidazole-based compounds include imidazole compounds such as 2-methylimidazole, 2-undecylimidazole, 2-heptadecylimidazole, 1,2-dimethylimidazole, 2-ethyl-4-methylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, and 2-phenylimidazoline.

The reaction initiators as described above may be used singly or in combination of two or more kinds thereof.

In a case where the resin composition of the present embodiment contains the reaction initiator, the content of the reaction initiator is not particularly limited, but is, for example, preferably 0.01 to 5.0 parts by mass, more preferably 0.01 to 3 parts by mass, still more preferably 0.05 to 3.0 parts by mass with respect to 100 parts by mass of the sum of the maleimide compound (A) and the hydrocarbon-based compound (B) (and the reactive compound (C) in a case of containing the reactive compound (C)).

(Prepreg, Film with Resin, Metal-Clad Laminate, Wiring Board, and Metal Foil with Resin)

Next, a prepreg for wiring board, a metal-clad laminate, a wiring board, and a metal foil with resin obtained using the resin composition of the present embodiment will be described. The respective symbols in the drawings indicate the following: 1 prepreg, 2 resin composition or semi-cured product of resin composition, 3 fibrous base material, 11 metal-clad laminate, 12 insulating layer, 13 metal foil, 14 wiring, 21 wiring board, 31 metal foil with resin, 32, 42 resin layer, 41 film with resin, and 43 support film.

FIG. 1 is a schematic sectional view illustrating an example of a prepreg 1 according to an embodiment of the present invention.

As illustrated in FIG. 1, the prepreg 1 according to the present embodiment includes the resin composition or a semi-cured product 2 of the resin composition and a fibrous base material 3. Examples of the prepreg 1 include those in which the fibrous base material 3 is present in the resin composition or a semi-cured product 2 thereof. In other words, the prepreg 1 includes the resin composition or semi-cured product thereof; and the fibrous base material 3 present in the resin composition or semi-cured product 2 thereof.

In the present embodiment, the "semi-cured product" is one in a state in which the resin composition is partly cured so as to be further cured. In other words, the semi-cured product is the resin composition in a semi-cured state (B-staged). For example, when a resin composition is heated, the viscosity of the resin composition first gradually decreases, then curing starts, and the viscosity gradually increases. In such a case, the semi-cured state includes a state in which the viscosity has started to increase but curing is not completed, and the like.

The prepreg to be obtained using the resin composition according to the present embodiment may include a semi-cured product of the resin composition as described above or include the uncured resin composition itself. In other words, the prepreg may be a prepreg including a semi-cured product of the resin composition (the resin composition in B stage) and a fibrous base material, or may be a prepreg including the resin composition before curing (the resin composition in A stage) and a fibrous base material. Specific examples of the prepreg include those in which a fibrous base material is present in the resin composition. The resin composition or semi-cured product thereof may be one obtained by heating and drying the resin composition.

When the prepreg and the metal foil with resin, metal-clad laminate and the like to be described later are fabricated, the resin composition according to the present embodiment is often prepared in the form of a varnish and used as a resin varnish. Such a resin varnish is prepared, for example, as follows.

First, the respective components that can be dissolved in an organic solvent, such as a resin component and a reaction initiator, are put into an organic solvent and dissolved. At this time, heating may be performed if necessary. Thereafter, an inorganic filler and the like, which are components that do not dissolve in an organic solvent, are added to and dispersed in the solution until a predetermined dispersion state is achieved using a ball mill, a bead mill, a planetary mixer, a roll mill or the like, whereby a varnish-like resin composition is prepared. The organic solvent used here is not particularly limited as long as it dissolves the maleimide compound (A), the hydrocarbon-based compound (B), and if necessary, the reactive compound (C) and the like and does not inhibit the curing reaction. Specific examples thereof include toluene, methyl ethyl ketone, cyclohexanone, cyclopentanone, methylcyclohexane, dimethylformamide, and propylene glycol monomethyl ether acetate. These may be used singly or two or more kinds thereof may be used concurrently.

Examples of the method for fabricating the prepreg 1 of the present embodiment using the varnish-like resin composition of the present embodiment include a method in which the fibrous base material 3 is impregnated with the resin composition 2 in the form of a resin varnish and then drying is performed.

Specific examples of the fibrous base material used in fabrication of the prepreg include glass cloth, aramid cloth, polyester cloth, LCP (liquid crystal polymer) nonwoven fabric, glass nonwoven fabric, aramid nonwoven fabric, polyester nonwoven fabric, pulp paper, and linter paper. When glass cloth is used, a laminate exhibiting excellent mechanical strength is obtained, and glass cloth subjected to flattening is particularly preferable. The glass cloth used in the present embodiment is not particularly limited, but examples thereof include glass cloth with low dielectric constant such as E glass, S glass, NE glass, Q glass, and L glass. Specifically, the flattening can be carried out, for example, by continuously pressing the glass cloth with press rolls at an appropriate pressure to flatten the yarn. As for the thickness of the fibrous base material, for example, a fibrous base material having a thickness of 0.01 to 0.3 mm can be generally used.

Impregnation of the fibrous base material 3 with the resin varnish (resin composition 2) is performed by dipping, coating, or the like. This impregnation can be repeated multiple times if necessary. At this time, it is also possible to repeat impregnation using a plurality of resin varnishes having different compositions and concentrations, and adjust the composition (content ratio) and resin amount to the finally desired values.

The fibrous base material 3 impregnated with the resin varnish (resin composition 2) is heated under desired heating conditions, for example, at 80° C. or more and 180° C. or less for 1 minute or more and 10 minutes or less. By heating, the solvent is volatilized from the varnish and the solvent is diminished or removed to obtain the prepreg 1 before curing (in A stage) or in a semi-cured state (B stage).

Figure 4:
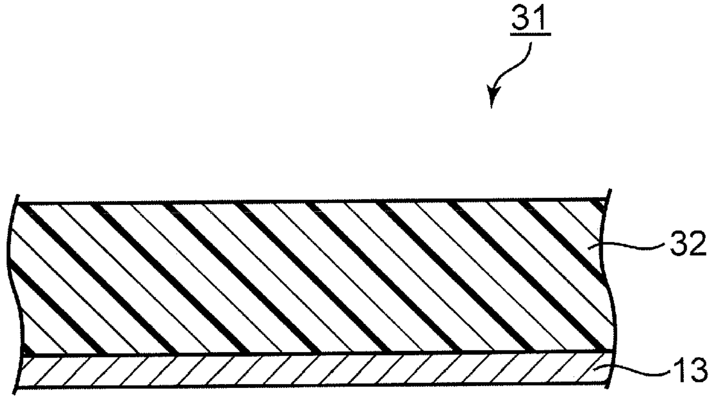
FIG. 4 is a schematic sectional view illustrating the configuration of a metal foil with resin according to an embodiment of the present invention.

As illustrated in FIG. 4, a metal foil with resin 31 of the present embodiment has a configuration in which a resin layer 32 containing the resin composition described above or a semi-cured product of the resin composition; and a metal foil 13 are laminated. In other words, the metal foil with resin of the present embodiment may be a metal foil with resin including a resin layer containing the resin composition before curing (the resin composition in A stage) and a metal foil, or may be a metal foil with resin including a resin layer containing a semi-cured product of the resin composition (the resin composition in B stage) and a metal foil.

Examples of the method for fabricating such a metal foil with resin 31 include a method in which a resin composition in the form of a resin varnish as described above is applied to the surface of the metal foil 13 such as a copper foil and then dried. Examples of the coating method include a bar coater, a comma coater, a die coater, a roll coater, and a gravure coater.

As the metal foil 13, metal foils used in metal-clad laminates, wiring boards and the like can be used without limitation, and examples thereof include copper foil and aluminum foil.

Figure 5:
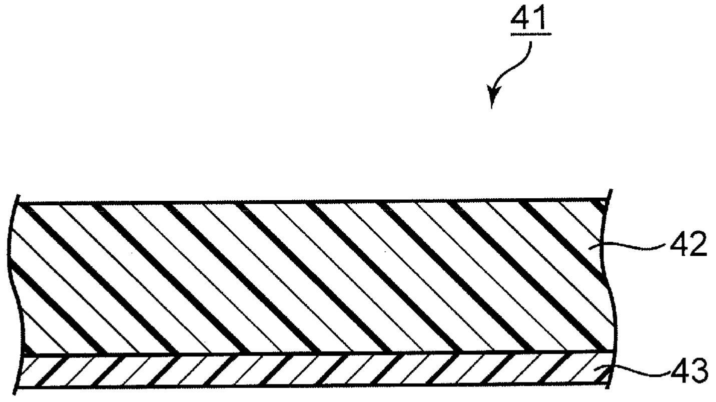
FIG. 5 is a schematic sectional view illustrating the configuration of a film with resin according to an embodiment of the present invention.

As illustrated in FIG. 5, a film with resin 41 of the present embodiment has a configuration in which a resin layer 42 containing the resin composition described above or a semi-cured product of the resin composition; and a film supporting base material 43 are laminated. In other words, the film with resin of the present embodiment may be a film with resin including the resin composition before curing (the resin composition in A stage); and a film supporting base material, or a film with resin including a semi-cured product of the resin composition (the resin composition in B stage); and a film supporting base material.

As the method for fabricating such a film with resin 41, for example, a resin composition in the form of a resin varnish as described above is applied to the surface of the film supporting base material 43, and then the solvent is volatilized from the varnish and diminished or removed, whereby a film with resin before curing (A stage) or in a semi-cured state (B stage) can be obtained.

Examples of the film supporting base material include electrical insulating films such as a polyimide film, a PET (polyethylene terephthalate) film, a polyethylene naphthalate film, a polyester film, a poly(parabanic acid) film, a polyether ether ketone film, a polyphenylene sulfide film, an aramid film, a polycarbonate film, and a polyarylate film.

In the film with resin and metal foil with resin of the present embodiment, the resin composition or semi-cured product thereof may be one obtained by drying or heating and drying the resin composition as in the prepreg described above.

The thickness and the like of the metal foil 13 and the film supporting base material 43 can be appropriately set depending on the desired purpose. For example, as the metal foil 13, a metal foil having a thickness of about 0.2 to 70 μm can be used. In a case where the thickness of metal foil is, for example, 10 μm or less, the metal foil may be a carrier-attached copper foil including a release layer and a carrier in order to improve handleability. The application of the resin varnish to the metal foil 13 and the film supporting base material 43 is performed by coating or the like, and this can be repeated multiple times if necessary. At this time, it is also possible to repeat coating using a plurality of resin varnishes having different compositions and concentrations, and adjust the composition (content ratio) and resin amount to the finally desired values.

Drying or heating and drying conditions in the fabrication method of the metal foil with resin 31 and film with resin 41 are not particularly limited, but a resin composition in the form of a resin varnish is applied to the metal foil 13 and film supporting base material 43, and then heating is performed under desired heating conditions, for example, at 50° C. to 180° C. for about 0.1 to 10 minutes to volatilize the solvent from the varnish and diminish or remove the solvent, whereby the metal foil with resin 31 and film with resin 41 before curing (A stage) or in a semi-cured state (B stage) are obtained.

The metal foil with resin 31 and film with resin 41 may include a cover film and the like, if necessary. By including a cover film, it is possible to prevent foreign matter from entering. The cover film is not particularly limited as long as it can be peeled off without damaging the form of the resin composition, and for example, a polyolefin film, a polyester film, a TPX film, films formed by providing a mold releasing agent layer on these films, and paper obtained by laminating these films on a paper base material can be used.

Figure 2:
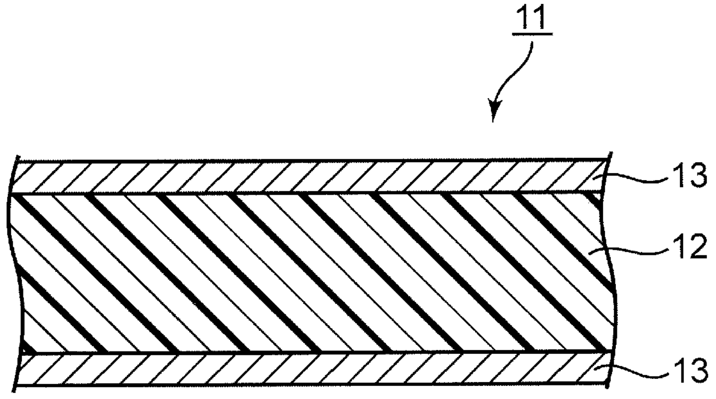
FIG. 2 is a schematic sectional view illustrating the configuration of a metal-clad laminate according to an embodiment of the present invention.

As illustrated in FIG. 2, a metal-clad laminate 11 of the present embodiment includes an insulating layer 12 containing a cured product of the resin composition described above or a cured product of the prepreg described above; and a metal foil 13. As the metal foil 13 used in the metal-clad laminate 11, a metal foil similar to the metal foil 13 described above can be used.

The metal-clad laminate 11 of the present embodiment can also be fabricated using the metal foil with resin 31 or film with resin 41 described above.

As the method for fabricating a metal-clad laminate using the prepreg 1, metal foil with resin 31, or film with resin 41 obtained in the manner described above, one or a plurality of prepregs 1, metal foils with resin 31, or films with resin 41 are superimposed on one another, and the metal foils 13 such as copper foil are further superimposed on both upper and lower sides or on one side, and this is laminated and integrated by heating and pressing, whereby a double-sided metal-clad or single-sided metal-clad laminate can be fabricated. The heating and pressing conditions can be appropriately set depending on the thickness of the laminate to be fabricated, the kind of the resin composition, and the like, but for example, the temperature may be set to 170° C. to 230° C., the pressure may be set to 1.5 to 5.0 MPa, and the time may be set to 60 to 150 minutes.

The metal-clad laminate 11 may be fabricated by forming a film-like resin composition on the metal foil 13 without using the prepreg 1 or the like and performing heating and pressing.

Figure 3:
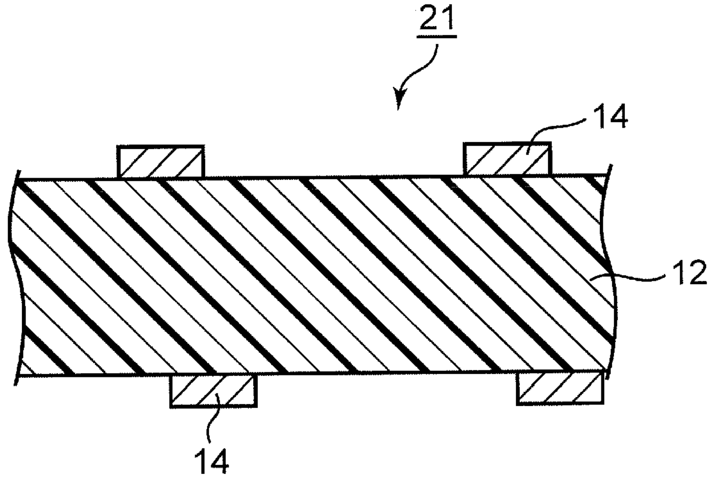
FIG. 3 is a schematic sectional view illustrating the configuration of a wiring board according to an embodiment of the present invention.

As illustrated in FIG. 3, a wiring board 21 of the present embodiment includes wiring 14 and an insulating layer 12 containing a cured product of the resin composition described above or a cured product of the prepreg described above.

The resin composition of the present embodiment is suitably used as a material for an insulating layer of a wiring board. As the method for fabricating the wiring board 21, for example, the metal foil 13 on the surface of the metal-clad laminate 11 obtained above is etched to form a circuit (wiring), whereby the wiring board 21 having a conductor pattern (wiring 14) provided as a circuit on the surface of a laminate can be obtained. Examples of the circuit forming method include circuit formation by a semi additive process (SAP) or a modified semi additive process (MSAP) in addition to the method described above.

The prepreg, film with resin, and metal foil with resin obtained using the resin composition of the present embodiment are extremely useful in industrial applications since the cured products thereof exhibit excellent low dielectric properties and high Tg as well as suppressed water absorbing properties. The metal-clad laminate and wiring board obtained by curing these have advantages of exhibiting low dielectric properties and a high Tg and of being able to suppress moisture absorption.

Hereinafter, the present invention will be described more specifically with reference to Examples, but the scope of the present invention is not limited thereto.

EXAMPLES

First, the components to be used in the preparation of resin compositions in the following examples will be described.

(Maleimide Compound (A))

Maleimide compound 1: Maleimide compound represented by Formula (3) (maleimide compound having indane structure in molecule).

Specifically, this is a maleimide compound synthesized as follows.

First, into a 1-L flask equipped with a thermometer, a condenser, a Dean-Stark tube, and a stirrer, 48.5 g (0.4 mol) of 2,6-dimethylaniline, 272.0 g (1.4 mol) of α,α'-dihydroxy-1,3-diisopropylbenzene, 280 g of xylene, and 70 g of activated clay were introduced and heated to 120° C. while being stirred. Further, the temperature was raised to 210° C. while removing the distilled water through the Dean-Stark tube. By doing so, the reaction was conducted for 6 hours. After that, the reaction mixture was cooled to 140° C., 145.4 g (1.2 mol) of 2,6-dimethylaniline was introduced, and then the temperature was raised to 220° C. By doing so, the reaction was conducted for 3 hours. After the reaction, the reaction mixture was air-cooled to 100° C., and diluted with 300 g of toluene, and activated clay was removed by filtration, and low molecular weight substances such as the solvent and unreacted substances were distilled off under reduced pressure, thereby obtaining 345.2 g of a solid. The obtained solid was an amine compound (amine equivalent: 348, softening point: 71° C.) represented by the following Formula (9).

[Chemical Formula 11]

(9)

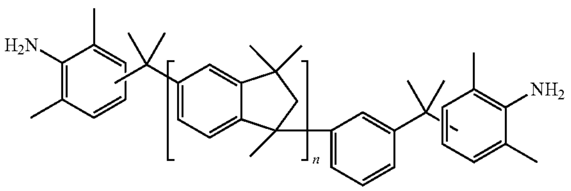

Next, 131.8 g (1.3 mol) of maleic anhydride and 700 g of toluene were introduced into a 2-L flask equipped with a thermometer, a condenser, a Dean-Stark tube, and a stirrer, and stirred at room temperature. After that, a mixed solution of 345.2 g of the amine compound represented by Formula (9) and 175 g of DMF was added dropwise over 1 hour. After completion of the dropwise addition, the mixture was further stirred at room temperature for 2 hours to conduct the reaction. After that, 37.1 g of p-toluenesulfonic acid monohydrate was added, the reaction solution was heated, and the azeotropic water and toluene were cooled and separated under reflux, and then only toluene was returned to the system, thereby conducting the dehydration reaction for 8 hours. After air-cooling to room temperature, the reaction mixture was concentrated under reduced pressure, the brown solution was dissolved in 600 g of ethyl acetate and washed with 150 g of deionized water three times and 150 g of 2% aqueous sodium bicarbonate solution three times, sodium sulfate was added for drying, then concentration was performed under reduced pressure, and the obtained reaction product was vacuum-dried at 80° C. for 4 hours, thereby obtaining 407.6 g of a solid. The obtained solid was analyzed by FD-MS spectrum, GPC and the like, and was found to be a maleimide compound represented by Formula (3) (n=2.59, molecular weight distribution (Mw/Mn)=1.49).

Maleimide compound 2: Maleimide compound represented by Formula (3) (maleimide compound having indane structure in molecule).

Specifically, this is a maleimide compound synthesized as follows.

First, into a 1-L flask equipped with a thermometer, a condenser, a Dean-Stark tube, and a stirrer, 48.5 g (0.4 mol) of 2,6-dimethylaniline, 272.0 g (1.4 mol) of α,α'-dihydroxy-1,3-diisopropylbenzene, 280 g of xylene, and 70 g of activated clay were introduced and heated to 120° C. while being stirred. Further, the temperature was raised to 210° C. while removing the distilled water through the Dean-Stark tube. By doing so, the reaction was conducted for 3 hours. After that, the reaction mixture was cooled to 140° C., 145.4 g (1.2 mol) of 2,6-dimethylaniline was introduced, and then the temperature was raised to 220° C. By doing so, the reaction was conducted for 3 hours. After the reaction, the reaction mixture was air-cooled to 100° C., and diluted with 300 g of toluene, and activated clay was removed by filtration, and low molecular weight substances such as the solvent and unreacted substances were distilled off under reduced pressure, thereby obtaining 364.1 g of a solid. The obtained solid was an amine compound (amine equivalent: 298, softening point: 70° C.) represented by the following Formula (10).

[Chemical Formula 12]

(10)

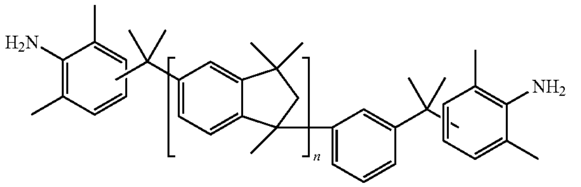

Next, 131.8 g (1.3 mol) of maleic anhydride and 700 g of toluene were introduced into a 2-L flask equipped with a thermometer, a condenser, a Dean-Stark tube, and a stirrer, and stirred at room temperature. After that, a mixed solution of 364.1 g of the amine compound represented by Formula (10) and 175 g of DMF was added dropwise over 1 hour. After completion of the dropwise addition, the mixture was further stirred at room temperature for 2 hours to conduct the reaction. After that, 37.1 g of p-toluenesulfonic acid monohydrate was added, the reaction solution was heated, and the azeotropic water and toluene were cooled and separated under reflux, and then only toluene was returned to the system, thereby conducting the dehydration reaction for 8 hours. After air-cooling to room temperature, concentration under reduced pressure was performed, the brown solution was dissolved in 600 g of ethyl acetate and washed with 150 g of deionized water three times and 150 g of 2% aqueous sodium bicarbonate solution three times, sodium sulfate was added for drying, then concentration was performed under reduced pressure, and the obtained reaction product was vacuum-dried at 80° C. for 4 hours, thereby obtaining 413.0 g of a solid. The obtained solid was analyzed by FD-MS spectrum, GPC and the like, and was found to be a maleimide compound represented by Formula (3) (n=1.47, molecular weight distribution (Mw/Mn)=1.81).

(Hydrocarbon-Based Compound (B))

Production of Hydrocarbon-Based Compound 1

First, the weight average molecular weight (Mw) and number average molecular weight (Mn) used in the production of hydrocarbon-based compound 1 below are values determined by the following analysis method.

(Analysis Method)

The molecular weights were calculated in terms of polystyrene using a polystyrene standard solution.

GPC: DGU-20A3R, LC-20AD, SIL-20AHT, RID-20A, SPD-20A, CTO-2, CBM-20A (all manufactured by Shimadzu Corporation)

Column: Shodex KF-603, KF-602×2, KF-601×2)

Coupled eluent: Tetrahydrofuran

Flow velocity: 0.5 ml/min.

Column temperature: 40° C.

Detection: RI (differential refraction detector)

Synthesis Example 1

Figure 6:
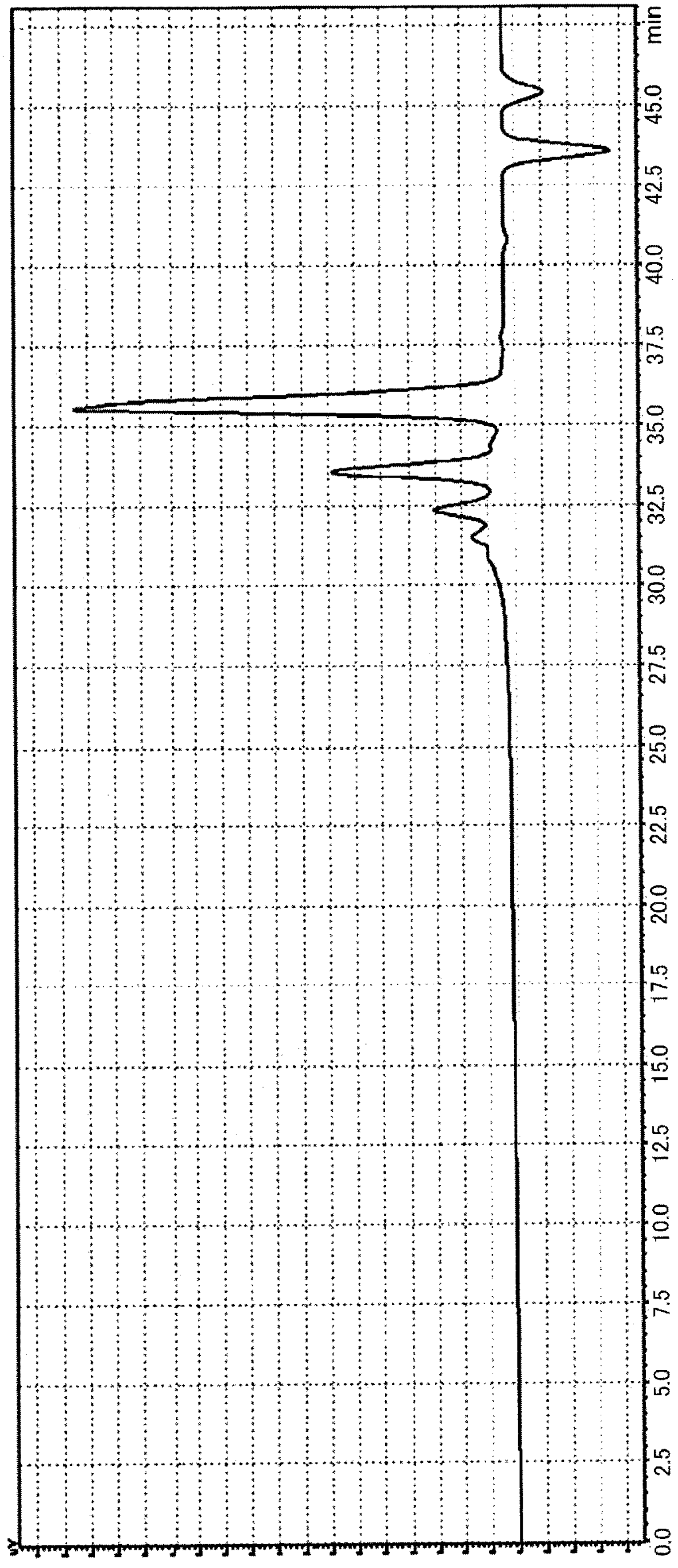
FIG. 6 illustrates a GPC chart of the compound obtained in Synthesis Example 1.
Figure 7:
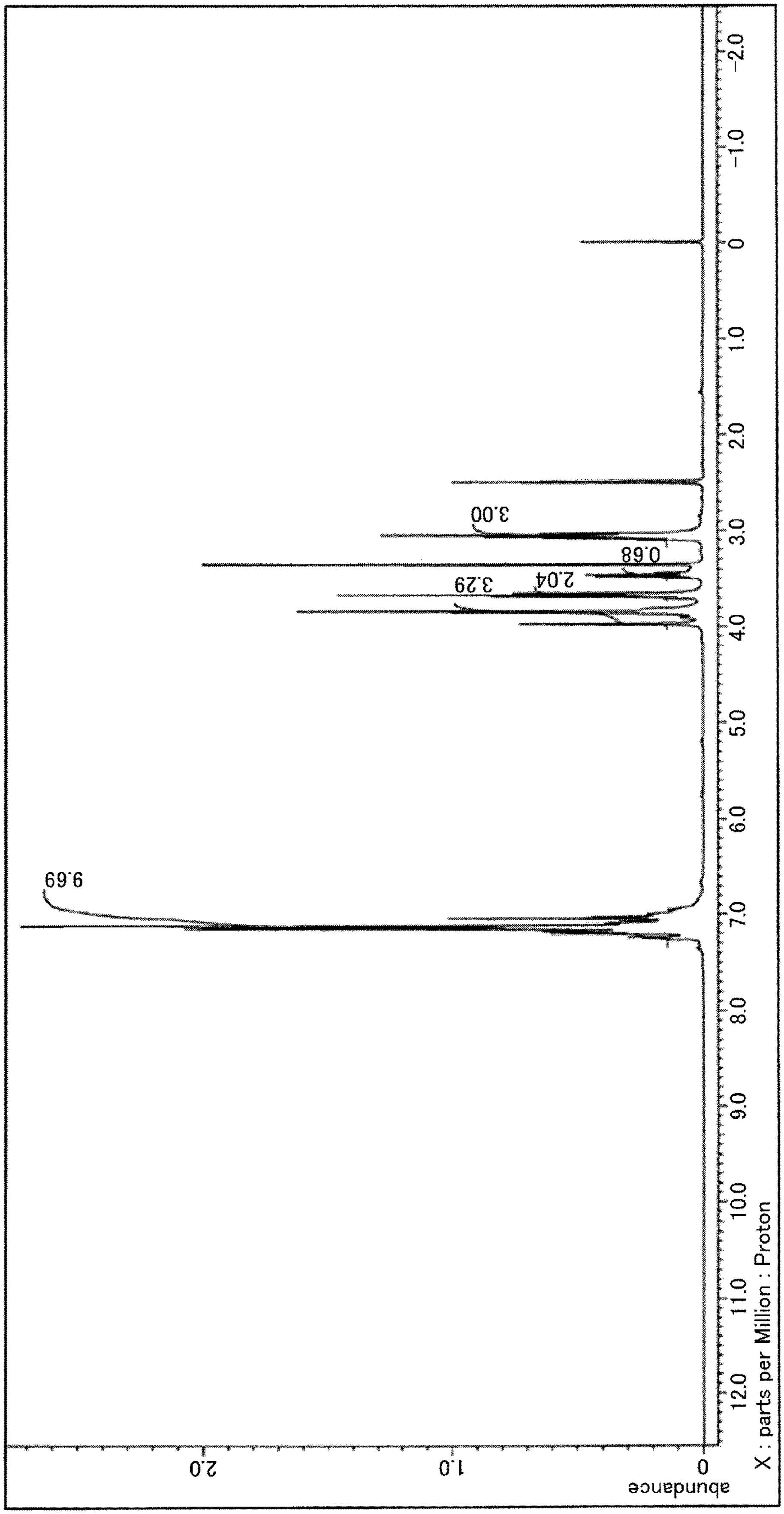
FIG. 7 illustrates a $^{1}$H-NMR chart of the compound obtained in Synthesis Example 1.

Into a flask equipped with a thermometer, a condenser, and a stirrer, 296 parts of 2-bromoethylbenzene (manufactured by Tokyo Chemical Industry Co., Ltd.), 70 parts of α,α'-dichloro-p-xylene (manufactured by Tokyo Chemical Industry Co., Ltd.), and 18.4 parts of methanesulfonic acid (manufactured by Tokyo Chemical Industry Co., Ltd.) were introduced, and the reaction was conducted at 130° C. for 8 hours. After being left to cool, the reaction mixture was neutralized with an aqueous sodium hydroxide solution, and subjected to extraction with 1200 parts of toluene, and the organic layer was washed with 100 parts of water five times. The solvent and excess 2-bromoethylbenzene were distilled off under heating and reduced pressure to obtain 160 parts of an olefin compound precursor (BEB-1) having a 2-bromoethylbenzene structure as a liquid resin (Mn: 538, Mw: 649). A GPC chart of the obtained compound is illustrated in FIG. 6. The repeating unit n calculated from the area % in the GPC chart was 1.7. A $^1$H-NMR chart (DMSO-d6) of the obtained compound is illustrated in FIG. 7. Signals attributed to a bromoethyl group were observed at 2.95 to 3.15 ppm and 3.60 to 3.75 ppm on the $^1$H-NMR chart.

Synthesis Example 2

Figure 8:
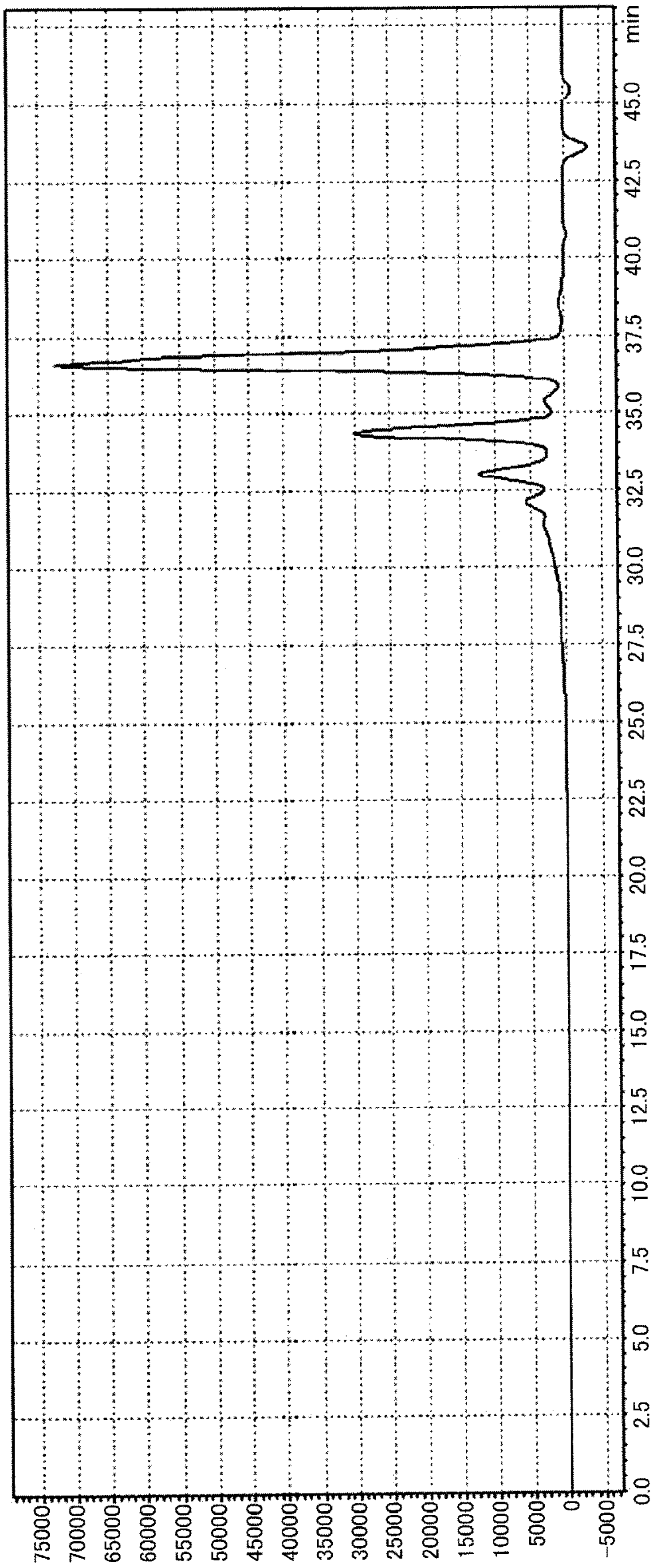
FIG. 8 illustrates a GPC chart of the compound obtained in Synthesis Example 2.
Figure 9:
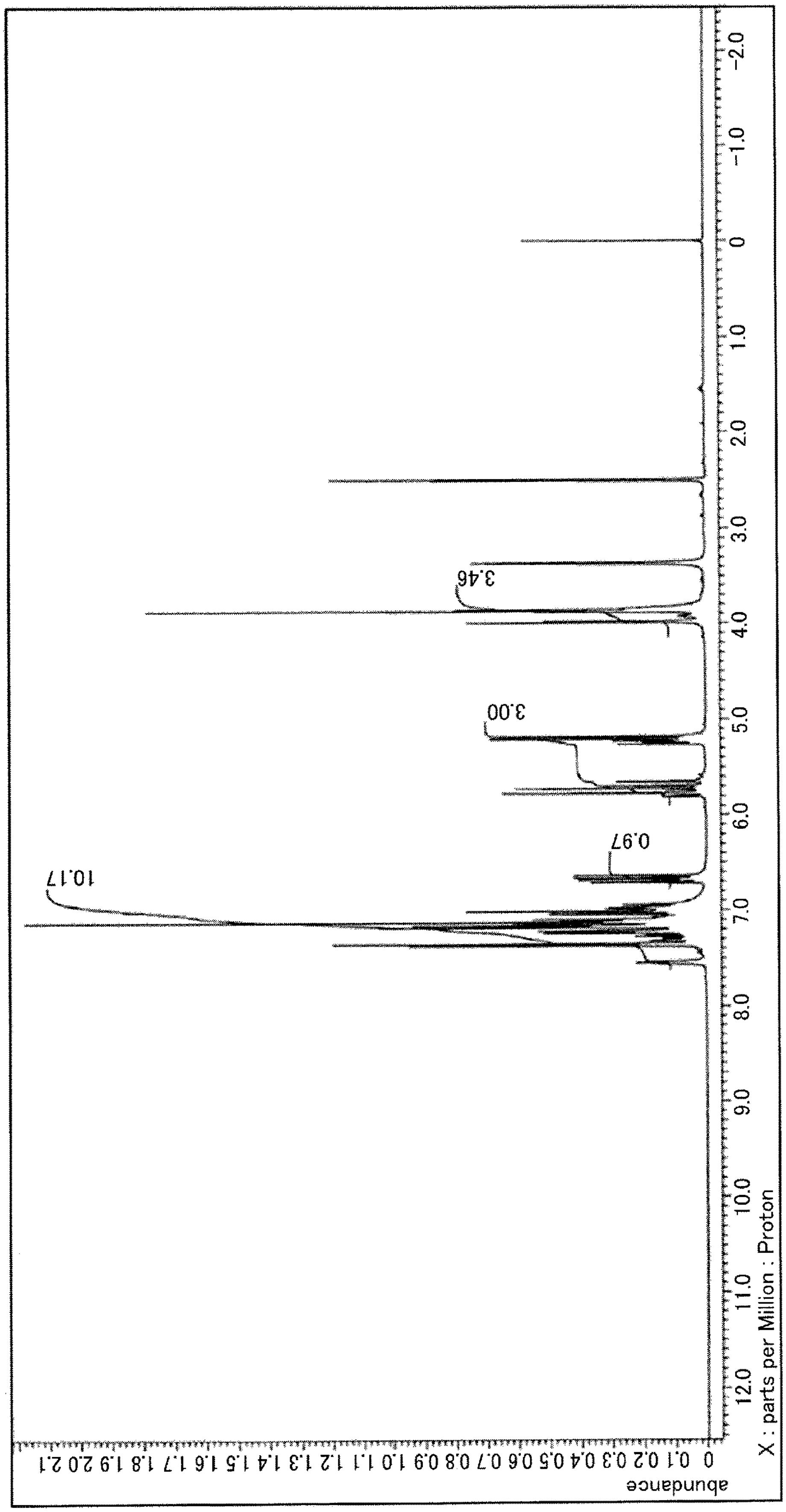
FIG. 9 illustrates a $^{1}$H-NMR chart of the compound obtained in Synthesis Example 2.

Next, 22 parts of BEB-1 obtained in Synthesis Example 1, 50 parts of toluene, 150 parts of dimethyl sulfoxide, 15 parts of water and 5.4 parts of sodium hydroxide were introduced into a flask equipped with a thermometer, a condenser, and a stirrer, and the reaction was conducted at 40° C. for 5 hours. After standing to cool, 100 parts of toluene was added, the organic layer was washed with 100 parts of water five times, and the solvent was distilled off under heating and reduced pressure to obtain 13 parts of a liquid olefin compound having a styrene structure as a functional group (Mn: 432, Mw: 575). A GPC chart of the obtained compound is illustrated in FIG. 8. The repeating unit n calculated from the area % in the GPC chart was 1.7. A $^1$H-NMR data (DMSO-d6) of the obtained compound is illustrated in FIG. 9. Signals attributed to a vinyl group were observed at 5.10 to 5.30 ppm, 5.50 to 5.85 ppm, and 6.60 to 6.80 ppm on the $^1$H-NMR chart.

The liquid olefin compound was referred to as hydrocarbon-based compound 1.

(Styrene)

Styrene (B1: reagent manufactured by FUJIFILM Wako Pure Chemical Corporation)

(Diene-Based Polymer)

Diene-based polymer (polybutadiene, B-3000: manufactured by Nippon Soda Co., Ltd.)

(Reactive Compound (C))

Maleimide compound (D) (solid component in MIR-3000-70MT, manufactured by Nippon Kayaku Co., Ltd.)

Polyphenylene ether compound (OPE-2st 1200, polyphenylene ether compound having vinylbenzyl group (ethenylbenzyl group) at terminal, manufactured by Mitsubishi Gas Chemical Company, Inc.)

(Reaction Initiator/Reaction Accelerator)

Peroxide (PERCUMYL D, dicumyl peroxide, manufactured by NOF Corporation)

(Flame Retardant)

Aromatic condensed phosphate ester (PX-200, manufactured by DAIHACHI CHEMICAL INDUSTRY CO., LTD.)

(Inorganic Filler)

Silica particles: "SO-C2" spherical silica (manufactured by ADMATECHS COMPANY LIMITED)

Examples 1 to 6 and Comparative Examples 1 and 2

[Preparation Method]

(Resin Varnish)

First, the respective components, that is, resin components (maleimide compound, hydrocarbon-based compound, reactive compound, and the like) were added to toluene at the blending proportion (parts by mass) presented in Table 1 so that the solid concentration was 50% by mass, and mixed. Depending on the sample, the reaction initiator, inorganic filler, and the like were added to the mixture, stirring was performed for 60 minutes, and then dispersion was performed using a bead mill to obtain a resin varnish.

(Fabrication of Evaluation Substrate)

A prepreg and an evaluation substrate (metal-clad laminate) were obtained as follows.

First, the obtained varnish was impregnated into a fibrous base material (glass cloth: #2116 type, L Glass manufactured by Asahi Kasei Corporation) and then heated and dried at 120° C. for 3 minutes, thereby fabricating a prepreg. At that time, the content (resin content) of the components constituting the resin composition with respect to the prepreg was adjusted to be 50% by mass by the curing reaction.

Next, an evaluation substrate (metal-clad laminate) was obtained as follows.

Two sheets of each of the obtained prepregs were stacked, and copper foil (FV-WS manufactured by Furukawa Electric Co., Ltd., thickness: 18 μm) was disposed on both sides of the stacked body. This as a body to be pressed was heated to a temperature of 220° C. at a rate of temperature rise of 4° C./min and heated and pressed under the conditions of 220° C., 120 minutes, and a pressure of 2 MPa, thereby obtaining an evaluation substrate (metal-clad laminate) having copper foil bonded to both surfaces and having a resin layer thickness of about 250 μm.

The prepregs and evaluation substrates (metal-clad laminates) fabricated as described above were used to conduct evaluation tests by the following methods.

<Evaluation Test 1>

(Glass Transition Temperature (Tg))

Using an unclad substrate obtained by removing the copper foil from the evaluation substrate obtained above by etching, Tg was measured using a viscoelastic spectrometer "DMS100" manufactured by Seiko Instruments Inc. At this time, dynamic viscoelasticity measurement (DMA) was performed in a tensile module at a frequency of 10 Hz, and the temperature at which tan & was maximized when the temperature was raised from room temperature to 350° C. at a rate of temperature rise of 5° C./min was taken as Tg. In this test, it is determined as acceptable when the Tg is 250° C. or more. Since Tg is evaluated only up to 350° C., those exceeding 350° C. are indicated as ">350".

(Dielectric Properties: Relative Dielectric Constant (Dk) and Dielectric Loss Tangent (Df))

The relative dielectric constant and dielectric loss tangent at 10 GHz were measured by the cavity perturbation method using an unclad substrate obtained by removing the copper foil from the evaluation substrate (metal-clad laminate) by etching as a test piece. Specifically, the relative dielectric constant and dielectric loss tangent of the evaluation substrate at 10 GHz were measured using a network analyzer (N5230A manufactured by Keysight Technologies). In this test, it is determined as acceptable when Dk is less than 3.5 and Df is less than 0.0035.

(Water Absorption Rate)

The water absorption rate (%) was measured in conformity with IPC-TM-650 2.6.2.1 using an unclad substrate obtained by removing the copper foil from the evaluation substrate (metal-clad laminate) by etching as a test piece. In this test, it is determined as acceptable when the water absorption rate is less than 0.4%.

The results are presented in Table 1.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Composition | | | | | | | | | |
| Maleimide compound (A) | Maleimide compound 1 | 50 | 70 | | 50 | 35 | 50 | | |
| | Maleimide compound 2 | | | 50 | | | | | 50 |
| Hydrocarbon-based compound | Hydrocarbon-based compound (B)1 | 50 | 30 | 50 | 40 | 35 | 50 | | |
| | Styrene B1 | | | | | | | 30 | |
| Diene-based polymer | Polybutadiene | | | | | | | | 50 |
| Reactive compound (C) | Maleimide compound (D) | | | | 10 | | | 70 | |
| | Polyphenylene ether compound | | | | | 30 | | | |

TABLE 1-continued

| | | Example 1 | Example 2 | Example 3 | Example 4 | Example 5 | Example 6 | Comparative Example 1 | Comparative Example 2 |
|---|---|---|---|---|---|---|---|---|---|
| Reaction Initiator/ reaction accelerator | Peroxide | 1 | 1 | 1 | 1 | 1 | 1 | 1 | 1 |
| Flame retardant | Aromatic phosphate ester | | | | | | 10 | | |
| Inorganic filler | Silica particles | | | | | | 100 | | |
| Evaluation | | | | | | | | | |
| Tg | ° C. | 275 | 260 | 290 | 280 | 255 | 255 | >350 | 320 |
| Dielectric properties | Dk @10 GHz | 3.1 | 3.2 | 3.1 | 3.1 | 3 | 3.3 | 3.2 | 3 |
| | Df @10 GHz | 0.0025 | 0.003 | 0.0027 | 0.0027 | 0.003 | 0.0021 | 0.0065 | 0.0045 |
| Water absorption rate | (%) | 0.23 | 0.35 | 0.25 | 0.25 | 0.25 | 0.15 | 1 | 0.4 |

DISCUSSION

As is clear from the results presented in Table 1, it was confirmed that a cured product exhibiting low dielectric properties, a high Tg, and a low water absorption rate is obtained from the resin composition of the present invention.

[Measurement Conditions]

1st cycle: Range of temperature rise 30° C.→275° C.

Rate of temperature rise: 20° C./min, Load: 10 g

2nd cycle: Temperature rise range 30° C.→300° C.

Rate of temperature rise: 10° C./min, Load: 10 g

The results are presented in Table 2.

TABLE 2

| Composition | | Example 1 | Example 4 | Example 5 | Example 6 |
|---|---|---|---|---|---|
| Maleimide compound (A) | Maleimide compound 1 | 50 | 50 | 35 | 50 |
| Hydrocarbon-based compound | Hydrocarbon-based compound (B)1 | 50 | 40 | 35 | 50 |
| Reactive compound (C) | Maleimide compound (D) | | 10 | | |
| | Polyphenylene ether compound | | | 30 | |
| Reaction Initiator/ reaction accelerator | Peroxide | 1 | 1 | 1 | 1 |
| Flame retardant | Aromatic phosphate ester | | | | 10 |
| Inorganic filler | Silica particles | | | | 100 |
| Evaluation | | | | | |
| Coefficient of thermal expansion (CTE) | | 16.5 | 16 | 15 | 14 |

On the other hand, in Comparative Example 1 in which a maleimide compound not having an indane structure is used, the high Tg and low dielectric constant exceed the acceptance criteria, but the dielectric loss tangent (Df) does not meet the acceptance criteria for this test, and the water absorption rate is also high. Similarly, in Comparative Example 2 in which the hydrocarbon-based compound (B) represented by Formula (1) is not contained as well, the values of dielectric loss tangent and water absorption rate are high and do not meet the acceptance criteria.

<Evaluation Test 2>

(Coefficient of Thermal Expansion (CTE))

Using an unclad substrate obtained by removing the copper foil from the evaluation substrate (metal-clad laminate) by etching as a test piece, the coefficient of thermal expansion in the surface direction of the base material (tensile direction, Y direction) at a temperature less than the glass transition temperature of the resin cured product was measured by the TMA (Thermo-mechanical analysis) method. Specifically, a TMA system ("TMA6000" manufactured by SII Nano Technology Inc.) was used for the measurement, and the measurement was performed in a tensile mode. In order to eliminate the influence of thermal strain on the test piece, the heating-cooling cycle was repeated two times, and the average coefficient of thermal expansion from 50° C. to 100° C. in the second temperature change chart was measured. A smaller value means a more favorable result. The unit is ppm/° C.

DISCUSSION

From the results in Table 2, it was found that in Examples 4 and 5, as compared with Example 1, the low thermal expansion properties are further improved as the reactive compound (C) is further contained. From the results for Example 6, it was also confirmed that the coefficient of thermal expansion is extremely low as an inorganic filler is contained.

This application is based on Japanese Patent Application No. 2021-83146 filed on May 17, 2021, the contents of which are included in the present application.

In order to express the present invention, the present invention has been described above appropriately and sufficiently through the embodiments with reference to specific examples, drawings and the like. However, it should be recognized by those skilled in the art that changes and/or improvements of the above-described embodiments can be readily made. Accordingly, changes or improvements made by those skilled in the art shall be construed as being included in the scope of the claims unless otherwise the changes or improvements are at the level which departs from the scope of the appended claims.

INDUSTRIAL APPLICABILITY

The present invention has wide industrial applicability in technical fields such as electronic materials, electronic devices, and optical devices.

The invention claimed is:

1. A resin composition comprising:

a maleimide compound (A) having an indane structure in a molecule; and a hydrocarbon-based compound (B) represented by the following Formula (1):

[Chemical formula 1]

(1)

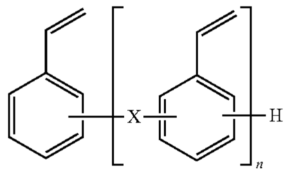

wherein X represents a hydrocarbon group having 6 or more carbon atoms and containing at least one selected from an aromatic cyclic group and an aliphatic cyclic group, and n represents an integer from 1 to 10.

2. The resin composition according to claim 1, wherein the indane structure includes a structure represented by the following Formula (2):

[Chemical formula 2]

(2)

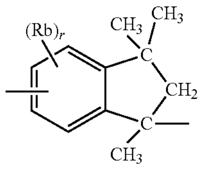

wherein Rb's each independently represent an alkyl group having 1 to 10 carbon atoms, an alkyloxy group having 1 to 10 carbon atoms, an alkylthio group having 1 to 10 carbon atoms, an aryl group having 6 to 10 carbon atoms, an aryloxy group having 6 to 10 carbon atoms, an arylthio group having 6 to 10 carbon atoms, a cycloalkyl group having 3 to 10 carbon atoms, a halogen atom, a hydroxyl group, or a mercapto group, and r represents an integer from 0 to 3.

3. The resin composition according to claim 1, wherein the maleimide compound (A) includes a maleimide compound (A1) represented by the following Formula (3):

[Chemical formula 3]

(3)

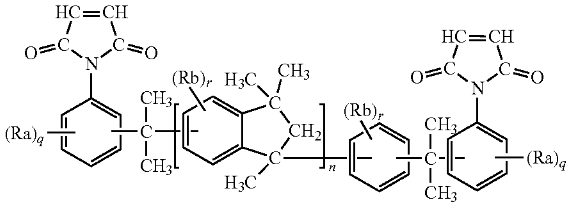

wherein Ra's each independently represent an alkyl group having 1 to 10 carbon atoms, an alkyloxy group having 1 to 10 carbon atoms, an alkylthio group having 1 to 10 carbon atoms, an aryl group having 6 to 10 carbon atoms, an aryloxy group having 6 to 10 carbon atoms, an arylthio group having 6 to 10 carbon atoms, a cycloalkyl group having 3 to 10 carbon atoms, a halogen atom, a nitro group, a hydroxyl group, or a mercapto group, Rb's each independently represent an alkyl group having 1 to 10 carbon atoms, an alkyloxy group having 1 to 10 carbon atoms, an alkylthio group having 1 to 10 carbon atoms, an aryl group having 6 to 10 carbon atoms, an aryloxy group having 6 to 10 carbon atoms, an arylthio group having 6 to 10 carbon atoms, a cycloalkyl group having 3 to 10 carbon atoms, a halogen atom, a nitro group, a hydroxyl group, or a mercapto group, q represents an integer from 0 to 4, r represents an integer from 0 to 3, and n represents an integer from 0.95 to 10.

4. The resin composition according to claim 1, wherein the hydrocarbon-based compound (B) includes a hydrocarbon-based compound (B1) represented by the following Formula (4):

[Chemical formula 4]

(4)

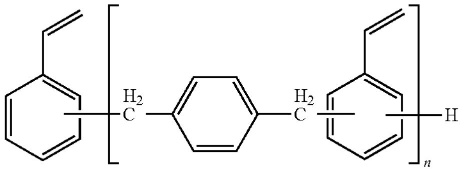

wherein n represents an integer from 1 to 10.

5. The resin composition according to claim 1, wherein a content of the maleimide compound (A) is 20 to 80 parts by mass with respect to 100 parts by mass of a total mass of the maleimide compound (A) and the hydrocarbon-based compound (B).

6. The resin composition according to claim 1, comprising a reactive compound (C) that reacts with at least one of the maleimide compound (A) or the hydrocarbon-based compound (B).

7. The resin composition according to claim 1, wherein the reactive compound (C) includes at least one selected from the group consisting of a maleimide compound (D) different from the maleimide compound (A), an epoxy compound, a methacrylate compound, an acrylate compound, a vinyl compound, a cyanate ester compound, an active ester compound, an allyl compound, a benzoxazine compound, a phenol compound, and a polyphenylene ether compound.

8. The resin composition according to claim 1, wherein a content of the hydrocarbon-based compound (B) is 5 to 50 parts by mass with respect to 100 parts by mass of a sum of the maleimide compound (A), the hydrocarbon-based compound (B), and the reactive compound (C).

9. The resin composition according to claim 1, wherein a content of the reactive compound (C) is 1 to 40 parts by mass with respect to 100 parts by mass of a sum of the maleimide compound (A), the hydrocarbon-based compound (B), and the reactive compound (C).

10. The resin composition according to claim 1, comprising an inorganic filler.

11. The resin composition according to claim 1, comprising a phosphorus-based flame retardant.

12. A prepreg comprising:

the resin composition according to claim 1 or a semi-cured product of the resin composition; and a fibrous base material.

13. A film with resin comprising:

a resin layer containing the resin composition according to claim 1 or a semi-cured product of the resin composition; and a support film.

14. A metal foil with resin comprising:

a resin layer containing the resin composition according to claim 1 or a semi-cured product of the resin composition; and a metal foil.

15. A metal-clad laminate comprising:

an insulating layer containing a cured product of the resin composition according claim 1; and a metal foil.

16. A wiring board comprising:

an insulating layer containing a cured product of the resin composition according claim 1; and wiring.

17. A metal-clad laminate comprising:

an insulating layer containing a cured product of the prepreg according to claim 12; and a metal foil.

18. A wiring board comprising:

an insulating layer containing a cured product of the prepreg according to claim 12; and wiring.

* * * * *